United States Patent
Uehara

[19]

[11] Patent Number: 6,118,738
[45] Date of Patent: Sep. 12, 2000

[54] AUTOMATIC DISK EXCHANGER FOR A PLURALITY OF DIFFERENTLY FORMATTED DISKS

[75] Inventor: Takashi Uehara, Kawasaki, Japan

[73] Assignee: Kabushiki Kaisha Toshiba, Kawasaki, Japan

[21] Appl. No.: 09/074,666

[22] Filed: May 8, 1998

[30] Foreign Application Priority Data

May 8, 1997 [JP] Japan ..................................... 9-118190

[51] Int. Cl.[7] ................................................. G11B 17/22
[52] U.S. Cl. ............................................... 369/34; 369/58
[58] Field of Search ................................. 369/33, 34, 58, 369/32, 30, 54, 47, 48; 386/126

[56] References Cited

U.S. PATENT DOCUMENTS

| | | | |
|---|---|---|---|
| 5,446,714 | 8/1995 | Yoshio et al. | 369/58 |
| 5,463,605 | 10/1995 | Nishida et al. | 369/58 |
| 5,587,981 | 12/1996 | Kamatani . | |
| 5,715,216 | 2/1998 | Dang et al. | 369/34 |
| 5,726,957 | 3/1998 | Hisamatsu et al. | 369/30 |
| 5,764,610 | 6/1998 | Yoshida et al. | 369/58 |
| 5,831,947 | 11/1998 | Okazaki et al. | 369/34 |
| 5,883,864 | 3/1999 | Saliba | 369/30 |
| 5,886,961 | 3/1999 | Yamashita et al. | 369/34 |

FOREIGN PATENT DOCUMENTS 5-3672  1/1993  Japan .

*Primary Examiner*—Tan Dinh
*Attorney, Agent, or Firm*—Pillsbury Madison & Sutro LLP

[57] ABSTRACT

The present invention provides a disk storage device capable of storing a plurality of types of disks, or a plurality of disks of the same type, and managing these disks easily to improve the operability of the apparatus. The invention reproduces the contents of the disks at high continuity even as disks of different types are exchanged. In order to manage disks stored in the disk storage device efficiently, there is provided the disk manager information memory device having the memory unit, in which the disk storage location data, disk type data and control data necessary for reproducing each disk are pre-stored together with additional data for managing each disk. When the additional data of a disk is input from an outside source, the management additional data which matches with the input additional data is searched, and the disk storage location data, data type data and control data, associated with the input additional data are read from the memory unit of the disk manager to be searched.

5 Claims, 18 Drawing Sheets

| DISK NUMBER | DISK TYPE | REPRODUCTION MANAGER INFORMATION |
|---|---|---|
| 1 | DVD | VMGI |
| 2 | DVD | VMGI |
| 3 | DVD | VMGI |
| 4 | NO DISK | |
| . . . | . . . | . . . |
| N−1 | CD | TOC |
| N | NO DISK | |
| N+1 | CD | TOC |
| N+2 | CD | TOC |
| . . . | . . . | . . . |

VMGI

| VIDEO MANAGER INFORMATION (VMGI) (MANDATORY) |
|---|
| VIDEO OBJECT SET FOR VIDEO MANAGER MENU (VMGM_VOBS) (OPTIONAL) |
| BACK UP OF VIDEO MANAGER INFORMATION (VMGI_BUP) (MANDATORY) |

| |
|---|
| VIDEO MANAGER INFORMATION MANAGEMENT TABLE (VMGI_MAT) (MANDATORY) |
| TITLE SEARCH POINTER TABLE (TT_SRPT) (MANDATORY) |
| VIDEO MANAGER MENU PGCI UNIT TABLE (VMGM_PGCI_UT) (MANDATORY WHEN VMGM_VOBS EXISTS) |
| PARENTAL MANAGEMENT INFORMATION TABLE (PTL_MAIT) (OPTIONAL) |
| VIDEO TITLE SET ATTRIBUTE TABLE (VTS_ATRT) (MANDATORY) |
| TEXT DATA MANAGER (TXTDT_MG) (OPTIONAL) |
| VIDEO MANAGER MENU CELL ADDRESS TABLE (VMGM_C_ADT) (MANDATORY WHEN VMGM_VOBS EXISTS) |
| VIDEO MANAGER MENU VIDEO OBJECT UNIT ADDRESS MAP (VMGM_VOBU_ADMAP) (MANDATORY WHEN VMGM_VOBS EXISTS) |

| VMGI_MAT | | | (DESCRIPTION ORDER) |
|---|---|---|---|
| RBP | | CONTENTS | No. OF BYTES |
| 0 TO 11 | VMG_ID | VMG IDENTIFIER | 12 BYTES |
| 12 TO 15 | VMG_EA | END ADDRESS OF VMG | 4 BYTES |
| 16 TO 27 | RESERVED | RESERVED | 12 BYTES |
| 28 TO 31 | VMGI_EA | END ADDRESS OF VMGI | 4 BYTES |
| 32 TO 33 | VERN | VERSION No. OF DVD VIDEO SPECIFICATIONS | 2 BYTES |
| 34 TO 37 | VMG_CAT | VIDEO MANAGER CATEGORY | 4 BYTES |
| 38 TO 45 | VLMS_ID | VOLUME SET IDENTIFIER | 8 BYTES |
| 46 TO 61 | RESERVED | RESERVED | 16 BYTES |
| 62 TO 63 | VTS_Ns | No. OF VIDEO TITLE SETS | 2 BYTES |
| 64 TO 95 | PVR_ID | PROVIDER UNIQUE ID | 32 BYTES |
| 96 TO 103 | POS_CD | POS CODE | 8 BYTES |
| 104 TO 127 | RESERVED | RESERVED | 24 BYTES |
| 128 TO 131 | VMGI_MAT_EA | END ADDRESS OF VMGI_MAT | 4 BYTES |
| 132 TO 135 | EP_PGCI_SA | START ADDRESS OF EP_PGCI | 4 BYTES |
| 136 TO 191 | RESERVED | RESERVED | 56 BYTES |
| 192 TO 195 | VMGM_VOBS_SA | START ADDRESS OF VMGM_VOBS | 4 BYTES |
| 196 TO 199 | TT_SRPT_SA | START ADDRESS OF TT_SRPT | 4 BYTES |
| 200 TO 203 | VMGM_PGCI_UT_SA | START ADDRESS OF VMGM_PGCI_UT | 4 BYTES |
| 204 TO 207 | PTL_MAIT_SA | START ADDRESS OF PTL_MAIT | 4 BYTES |
| 208 TO 211 | VTS_ATRT_SA | START ADDRESS OF VTS_ATRT | 4 BYTES |
| 212 TO 215 | TXTDT_MG_SA | START ADDRESS OF TXTDT_MG | 4 BYTES |
| 216 TO 219 | VMGM_C_ADT_SA | START ADDRESS OF VMGM_C_ADT | 4 BYTES |
| 220 TO 223 | VMGM_VOBU_ADMAP_SA | START ADDRESS OF VMGM_VOBU_ADMAP | 4 BYTES |
| 224 TO 255 | RESERVED | RESERVED | 32 BYTES |
| 256 TO 257 | VMGM_V_ATR | VIDEO ATTRIBUTE OF VMGM | 2 BYTES |
| 258 TO 259 | VMGM_AST_Ns | No. OF AUDIO STREAMS OF VMGM | 2 BYTES |
| 260 TO 267 | VMGM_AST_ATR | AUDIO STREAM ATTRIBUTE OF VMGM | 8 BYTES |
| 268 TO 323 | RESERVED | RESERVED | 56 BYTES |
| 324 TO 339 | RESERVED | RESERVED | 16 BYTES |
| 340 TO 341 | VMGM_SPST_Ns | No. OF SUB-PICTURE STREAMS OF VMGM | 2 BYTES |
| 342 TO 347 | VMGM_SPST_ATR | SUB-PICTURE STREAM ATTRIBUTE OF VMGM | 6 BYTES |
| 348 TO 1023 | RESERVED | RESERVED | 676 BYTES |
| 1024 TO 2291 (MAX) | FP_PGCI | FIRST PLAY PGCI | 0 OR (236 TO 1268) BYTES |

FIG. 12

TT_SRPTI  (DESCRIPTION ORDER)

|  | CONTENTS | NUMBER OF BYTES |
|---|---|---|
| (1) TT_SRP_Ns | NUMBER OF TITLE SEARCH POINTERS | 2BYTES |
| RESERVED | RESERVED | 2BYTES |
| (2) TT_SRPT_EA | END ADDRESS OF TT_SRPT | 4BYTES |

FIG. 14

TT_SRP  (DESCRIPTION ORDER)

|  | CONTENTS | NUMBER OF BYTES |
|---|---|---|
| (1) TT_PB_TY | TITLE PLAYBACK TYPE | 1BYTE |
| (2) AGL_Ns | NUMBER OF ANGLES | 1BYTE |
| (3) PTT_Ns | NUMBER OF PART_OF_TITLES | 2BYTES |
| (4) TT_PTL_ID_FLD | PARENTAL_ID_FIELD FOR TITLES | 2BYTES |
| (5) VTSN | VTS NUMBER | 1BYTE |
| (6) VTS_TTN | VTS TITLE NUMBER | 1BYTE |
| (7) VTS_SA | START ADDRESS OF THE VTS | 4BYTES |

FIG. 15

AUTOMATIC DISK EXCHANGER FOR A PLURALITY OF DIFFERENTLY FORMATTED DISKS

BACKGROUND OF THE INVENTION

1. Field of the Invention

The present invention relates to an improved data reproduction apparatus equipped with an automatic disk exchanger capable of automatically exchanging an optical disk with a different type or format of disk.

2. Description of Related Art

Numerous types of optical disks are presently available on the market as audio/video data recording media. For example, optical disks now available include the digital audio compact disk (hereinafter "CD") having a diameter of 8 cm or 12 cm, and the analog video laser disk (hereinafter "LD") having a diameter of 20 cm or 30 cm.

A plurality of sub-codes (channels P, Q, R to W) are recorded on a CD based on the CD format. Of these sub-codes, channel Q contains addresses, and an address always contains "1" for CDs (for example, "0001" in 4-bit data). A typical reproduction apparatus will have adjustment unit for determining what type of optimal disk is in the apparatus. Therefore, as the judgment unit of a reproduction apparatus detects "1" corresponding to channel Q, it can be determined that the optical disk set in the reproduction apparatus is a CD.

With regard to the LD, the determination is made on the basis of the size of the disk, with a sensor provided in the reproduction apparatus to detect whether or not the size of the disk set therein is larger than 12 cm (or if the diameter of the disk is 20 cm or larger). Since there is no CD which is larger than 12 cm in diameter, an LD can be identified by such a sensor.

In addition to the CD and LD, high-density video disk (hereinafter "DVD") capable of recording moving pictures and a plurality of voice data which are in accordance with the MPEG2 (Moving Picture Expert Group 2) standard has recently been developed.

A DVD is an optical disk having the same diameter as that of a CD, and appears similar thereto. The difference lies in whether it is an adhesion type or a single plate type and it is not easy for an inexperienced person to identify them from each other. Where the size of the DVD is 8 cm or 12 cm as with a CD, an inexperienced user may easily become confused as to which type of disk is set in the reproduction apparatus. In such a case, the user must take the disk out of the reproduction apparatus, and read the label of the disk to confirm whether it is a DVD or CD. After that, he or she must return the disk to the apparatus, and perform a necessary operation on the apparatus corresponding to the type of the disk, so as to start the reproduction. For a user, such work is very laborious.

As described above, recently, there are numerous types of disks having similar appearances, which are available in the market, and the users are required to purchase different reproduction apparatus for each type of disk.

Furthermore, using a plurality of reproduction apparatuses of different types is very inconvenient and also a heavy financial burden to have access to all the optical disk formats.

In one approach to overcome this problem, a device was developed which is capable of rendering a plurality of disks of the same type stand by in a disk storage unit and retrieve, when disk selection data is provided, a disk corresponding to the selection data. In this device, the retrieved disk is automatically transferred to the disk drive unit of the reproduction apparatus, and set in the apparatus. After the disk is set, the apparatus starts to reproduce the contents of the disk. The above-described disk data reproduction apparatus is called a disk data reproduction apparatus or data reproduction apparatus having an automatic disk exchanger.

However, the conventional disk data reproduction apparatus and automatic disk exchanger entails a drawback in that it requires a great amount of time before the data of a disk is actually reproduced after the disk is exchanged.

BRIEF SUMMARY OF THE INVENTION

Based on the foregoing deficiency in the related art, it is an object of the present invention to provide a disk data reproduction apparatus having an automatic disk exchanger which is capable of reproducing the disk data in a very short time after the exchange of the disk.

Furthermore, another object of the present invention is to provide a disk data reproduction apparatus having an automatic disk exchanger, including a disk storage unit capable of containing a plurality of disks of different formats or the same format, and freely managing the disks contained in the unit so as to enhance the operability of the device.

In order to achieve the above-described objects, the present invention comprises a disk container unit capable of containing a plurality of disks of different types or the same type, and a disk manager having a memory unit which pre-stores position data as to where a disk is contained, disk type data, and control data necessary for reproducing the data of each of the disks, together with additional data for managing the disks. Further, the present invention comprises a searcher which, when additional data of a disk is input from outside, searches additional data corresponding to the input additional data, by comparing it with the disk management additional data, and reading the position data, the disk type data and the control data related to the additional data, from the memory unit of the disk manager.

With the above apparatus, regardless of whether a large number of different types of disks are contained in the apparatus, once a disk to be played is selected, the appropriate reproduction mode for the disk can be easily set by searching the data corresponding to the disk from the memory unit.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out above.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing an example of the table of the disk manager information memory device shown in FIG. 1;

FIG. 11 is a diagram illustrating the structure of the logic format of a DVD;

FIG. 12 is a diagram illustrating the structure of VMGI_MAT shown in FIG. 11;

FIG. 14 is a diagram illustrating the structure of TT_SRPT1 shown in FIG. 13;

FIG. 15 is a diagram illustrating the structure of TT_SRP shown in FIG. 13;

DETAILED DESCRIPTION OF THE INVENTION

Embodiments of the present invention will now be described with reference to accompanying drawings.

Figure 1:
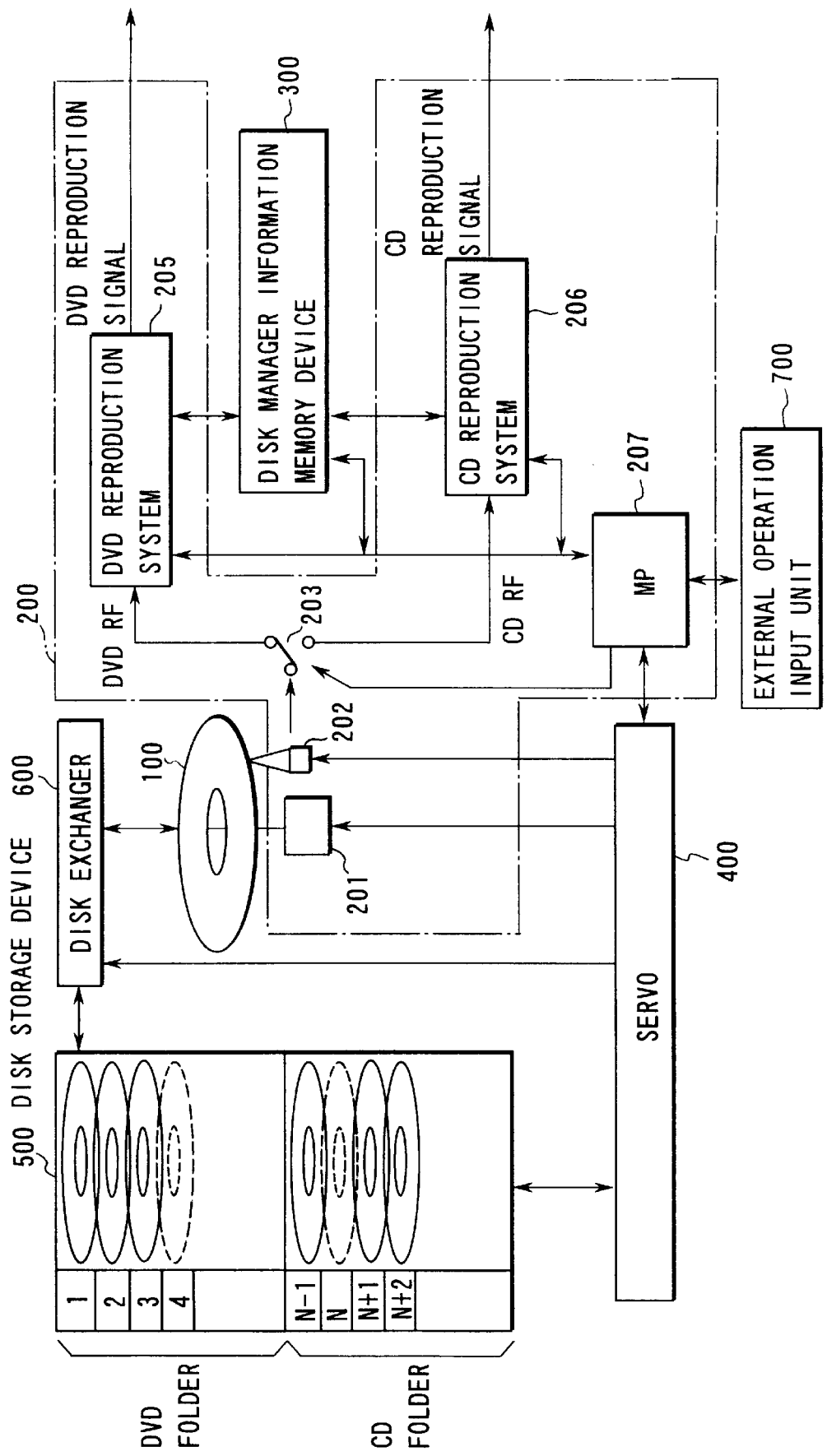
FIG. 1 is a diagram showing an embodiment of the present invention.

FIG. 1 shows the first embodiment of the present invention. As can be seen in this figure, an optical disk 100 is placed in a compatible reproduction apparatus 200. In the reproduction apparatus 200, the optical disk 100 is rotated by a disk motor 201. An optical pick-up apparatus 202 reads data recorded on the optical disk 100. A read signal withdrawn from the pick-up apparatus 202 is introduced to one of a DVD data reproduction system 205 and a CD data reproduction system 206 via a selector 203. The DVD data reproduction system 205 has the reproduction properties compatible with the reproduction of data of DVDs, whereas the CD data reproduction system 206 has the reproduction properties compatible with the reproduction of CDs.

When reproducing a DVD, the management of the DVD is read from a manager information memory device 300, and used in the DVD data reproduction system 205. When playing a CD, the management of the CD is read from a manager information memory device 300, and used in the CD data reproduction system 206.

The read and write operations for manager information with respect to the manager information memory device 300 are executed under the control of the micro-processor 207.

The micro-processor 207 manages and controls the entire apparatus. The manager information for managing and controlling various types of disks contained in the disk storage device 500 under the control of the micro-processor 207 are transferred to the disk manager information memory apparatus 300 in advance. Therefore, when a disk set in the reproduction device 200 and a disk contained in the disk storage device 500 are exchanged by a disk exchanger 600, it is not required to read the manager information of the disk set in the reproduction device 200 from the disk. Therefore, the time required to actually obtain the reproduction data from the point when the disks are exchanged is shortened by the time required to read the manager information.

The disk storage device 500 is equipped with a detector for detecting whether or not disks are present, and the output of the a detector is read by the micro-processor 207.

A servo device 400, upon receiving control data from the micro-processor 207, carries out the control of the position where the pick-up device 202 is moved, the focusing control and the tracking control of the pick-up device 202. The servo device 400 also controls the rotation of the disk monitor 201. Further, the servo device executes various types of controls for the disk storage device 500 as well as for the disk exchanger 600. The properties of the servo device 400 are appropriately set by the micro-processor 207 in accordance with the type of the disk to be played.

The disk storage device 500 is capable of containing a plurality of disks of different types or the same type, and therefore it includes a plurality of DVD folders and a plurality of CD folders. Further, a disk number, which corresponds to a respective disk (folder), is given as additional data. The disk exchanger 600 is capable of returning the optical disk 100 set in the reproduction device 300 to the disk storage unit, and searching a desired disk in the disk storage device 500, retrieving it, and placing it in the reproduction device 200.

The data used for the search is given from, for example, an external operation input unit 700 to the micro-processor 207. The micro-processor 207 confirms if the additional data corresponding to the data for the search is present in the disk manager information memory device 300. After the confirmation, if it is judged that the additional data corresponding to the data for the search is stored in the disk manager information memory device 300, the data for the search is given to the disk exchanger 600 via the servo device 400 from the micro-processor 207. The data for the search is given, for example, in the form of a disk number (additional data).

The disk exchanger 600, when a disk number is given thereto, confirms if there is any disk placed in the reproduction device 200. In the case where a disk is present in the reproduction device 200, the data indicating that the presence of disk is confirmed is given to the micro-processor 400. The micro-processor 400 judges if the disk present in the disk data reproduction device 200 is the one designated by the additional data. If the result of this determination indicates that it is a disk designated by the additional data, the entire apparatus is controlled such that the reproduction of the data of the disk is started immediately.

Or, if the disk presently placed in the disk data reproduction device 200 is not the one designated by the additional data, the micro-processor 200 controls the disk exchanger 600 such that the disk placed in the disk data reproduction device 200 is returned to the folder in the disk storage device 500, where it was originally located.

Next, the micro-processor 207 controls the disk exchanger 600 such that the disk placed at the position of the disk number designated by the disk storage device 500 is taken out and placed in the reproduction device 200. Where the disk set in the reproduction device 200 is, for example, a DVD, the micro-processor 207 reads the manager information of the corresponding DVD from the manager information memory device 300, and assigns the manager information to the DVD data reproduction system 205. Thus, the manager information of a DVD is not read from the DVD itself. Consequently, at the point where the disk is set, the reproduction apparatus 200 need not read the manager information once again from the disk, and therefore the data necessary for the reproduction of the data of the disk can be set to the DVD data reproduction system 205.

In the above-provided description, a disk number is given from outside as the data for the search; however the present invention is not limited to this application, but there are various types of methods. For example, the title preset for the disk may be given as the data for the search. When the title (additional data) is given from outside, it is determined whether or not the disk number (storage position) corresponding to the title (i.e. the manager information necessary for reproducing the disk corresponding to the title) is stored in the disk manager information memory device 300. Where the manager information of the disk corresponding to the title given from outside is present in the disk manager information memory device 300, various types of corresponding data, namely, the disk number and the manager information necessary for the reproduction, are set to the disk data reproduction system.

Where, for example, new disks are added to the disk storage device 500, or all of the disks are replaced with another set of disks, the micro-processor 207 carries out the following data process to manage the disks contained in the disk storage device 500. Specifically, the micro-processor 207 controls the disk manager information memory device 300 to store the position data as to where the disk is contained, the disk number, the disk type data, and the control data necessary for reproducing the data of the disk, for each of the disks, together with the additional data for managing the disks. When the additional data for a disk (external additional data) is input from outside, it is compared with the additional data for the management (internal additional data) so as to search the additional data which matches. The disk storage position data, the disk type data and control data, which are related to the matching additional data, are read from the disk manager information memory device 300.

The additional data may be a disk number or a title as described above.

FIG. 2 is a table showing the disk manager information stored in the disk manager information memory device 300. The item of disk number corresponds to the disk position in the disk storage device 500. In the item of disk type, for example, a symbol which distinguishes DVD and CD from each other, or a symbol indicating that there is no disk, is written. As the reproduction manager information, the manager information called video manager information (VMGI) and table of contents (TOC) are stored respectively for DVD and CD.

Figure 3:
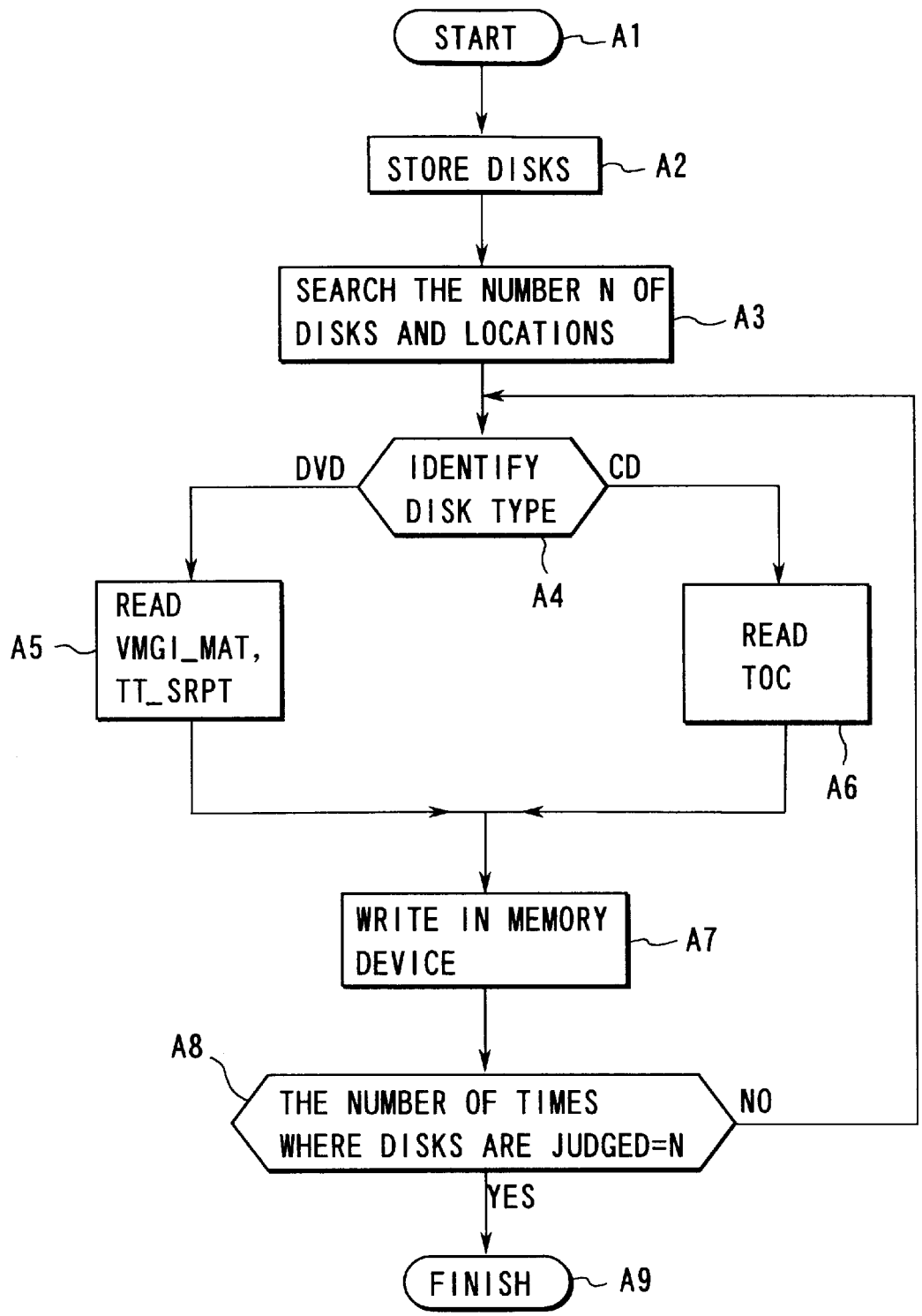
FIG. 3 is a flowchart illustrating the operation of the apparatus shown in FIG. 1.

FIG. 3 is a diagram illustrating the processing procedure where the table shown in FIG. 2 is constructed.

When one or more disks are stored in the disk storage device 500, the test for determining the number of disks stored and the storage positions is executed (Step A1 to A3). Then, when all the storage positions are detected, the types of the disks located at the respective positions are determined one after another (Step A4).

When a disk is of a DVD type, the disk is driven to rotate. Then, from the reproduction signals of the disk, at least a video manager information management table (VMGI_MAT) and a title search pointer (TT_SRPT), which will be later explained, are read, and stored in the disk manager information memory device 300 (Steps A5 and A7).

If the disk is a CD as determined in Step A4, the disk is driven to rotate. Then, from the reproduction signals of the disk, the TOC is read and stored in the disk manager information memory device 300 (Steps A6 and A7). It should be noted that VMGI_MAT and TT_SRPT are reproduction manager information necessary to reproduce the data of a DVD, and TOC is reproduction manager information necessary to reproduce the data of a CD.

In Step A7, after storing the reproduction manager information, the types of the disks and the disk numbers, it is determined whether the construction of the disk manager information has been carried out for the N number of disks at all of the positions detected before. If it is necessary to carry out the construction of the disk manager information, the procedure returns to Step A4, and if the construction of the disk manager information for the disks at all positions is completed, this procedure is finished (Step A9).

Figure 4:
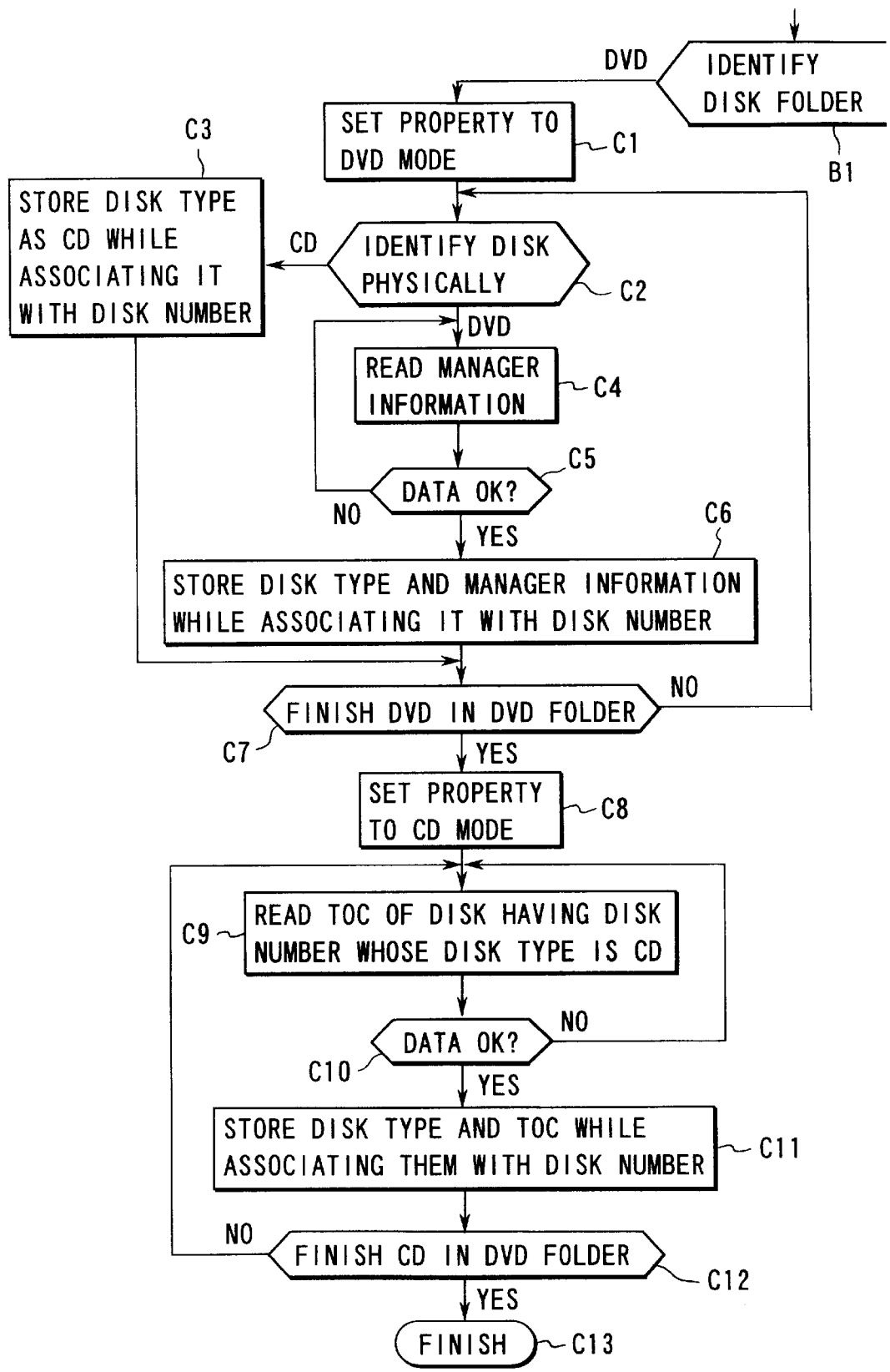
FIG. 4 is another flowchart illustrating the operation of the apparatus shown in FIG. 1.

FIG. 4 is a flowchart showing another example how the disk manager information is constructed.

In this example, the disk storage positions in the disk storage device 500 are set to be grouped into a DVD folder type and a CD folder type, and such grouping is effectively utilized. More specifically, when the construction of the disk manager information is started after the disks are stored, it is determined whether the position of a newly inserted disk belongs to the DVD folder or CD folder (Step B1).

FIG. 4 shows the procedure when it is determined that the new disk is positioned in the DVD folder. It should be noted that the judgment of a folder can be made by registering the DVD and CD folders separately from the disk numbers. For example, the disk number assigned to the DVD folder and that assigned to the CD folder may be distinguished from each other by a suffix.

Supposing that the DVD folder is recognized by the micro-processor, the reproduction device 200 is set in the DVD mode, and the disk is set in the reproduction device by the disk exchanger 600. Then, the reproduction device 200 actually starts to operate, and the identification of the type of disk is carried out by means of a physical method. The identification of a disk is carried out by utilizing the light reflection characteristics which are determined by the structure of the disk. That is, a disk is identified by testing, for example, the characteristics of its focus error signal or sub-beam signal. The focus error signal changes its level in accordance with the distance of the beam applied to the disk, in the form of an S shape. For a DVD, since it has the structure of two substrates adhered to each other, a signal of S-shaped characteristics is obtained two times during the focal adjustment. By contrast, for a CD, since it has the structure of a single substrate, a signal of S-shaped characteristics is obtained one time during the focal adjustment.

When a determination is made to indicate that a disk placed in the reproduction device 200 is a CD in Step C2, such a judgment means that a CD is stored in a folder which is suppose to store DVDs. When such a judgment is made, the disk identification at the position of the corresponding disk number in the table of the memory device 300 is written as CD. In the case where a disk set in the reproduction device 200 is judged to be DVD in Step C2, the procedure proceeds to Step C4. In this step, the reproduction manager information of the disk is read, and it is determined whether or not correct data is obtained in Step C5. If the read data is correct, the reproduction manager information is written in the area of the disk number corresponding to the data. Thus, the memory contents of the disk manager information memory device 300 are constructed.

In the next Step C7, it is determined whether or not the construction of the disk manager information is completed, with regard to DVD disks in the DVD folder. If not completed, the procedure returns to Step C2, or if completed, the procedure moves on to Step C8, where the characteristics of the reproduction device 200 are switched to the CD mode. Subsequently, in Step C9, the disk number which has a disk type of CD is confirmed.

Such confirmation is made by searching the memory data stored in the disk manager information memory device 300 in Step C3. If the disk number is confirmed, the disk of the disk number is played in Step C9, and its TOC is read.

Then, in Step C10, the correctness of the data is confirmed, and if it is correct, the disk identification, TOC and the disk number are associated with each other, and they are stored in the disk manager information memory device 300. Then it is confirmed whether or not the manager information of all the CDs in the DVD folder have been constructed, and if they have been constructed, the procedure is finished (Step C13).

Figure 5:
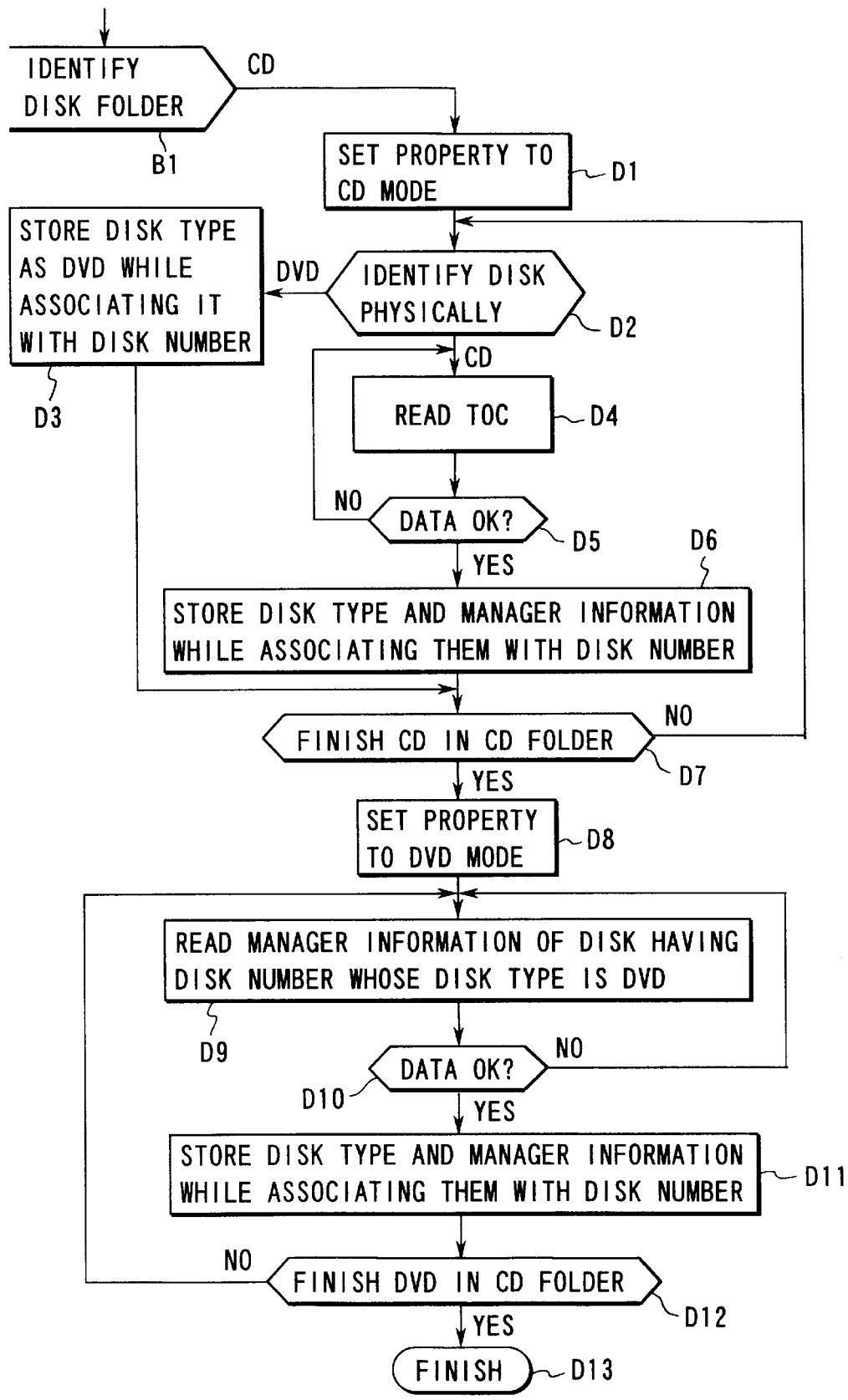
FIG. 5 is a still another flowchart illustrating the operation of the apparatus shown in FIG. 1.

FIG. 5 shows the procedure of the process where the detected folder is judged to be for CDs in Step B1. This process is subsequently executed after the process illustrated in FIG. 4 is executed.

In this case, the reproduction device 200 is set to the CD mode, and the disk is set in the reproduction device 200 by the disk exchanger 600. Then, the reproduction device 200 starts to actually operate, and identify the disk by a physical method.

When a judgment is made to indicate that a disk set in the reproduction device 200 is identified to be a DVD in Step D2, such a judgment means that a DVD is stored in a folder which is suppose to store CDs. When such a judgment is made, the disk type is written in the area of the corresponding disk number as DVD. Where a disk set in the reproduction device 200 is judged to be CD in Step D2, the procedure proceeds to the Step D4. In this step, the reproduction manager information (TOC) of the disk is read, and it is determined whether or not correct data is obtained in Step D5. Where the read data is correct, the TOC is written in the table of the disk manager information memory device 300 while associating the TOC with the disk number in Step D6.

In the next Step D7, it is determined whether or not the construction of the disk manager information is completed, with regard to CD disks in the CD folder. If not completed, the procedure returns to Step D2, or if completed, the procedure moves on to Step D8, where the characteristics of the reproduction device 200 are switched to the DVD mode. Subsequently, in Step D9, the disk number which has a disk type of DVD is confirmed. Such confirmation is made by searching the memory data written in the disk manager information memory device 300 in Step D3. Where the disk number is confirmed, the disk of the disk number is played in Step D9, and its the manager information is read. Then, in Step D10, the correctness of the data is confirmed, and if it is correct, the disk identification, the manager information and the disk number are associated with each other, and they are stored in the disk manager information memory device 300 in Step D11. Then, it is confirmed whether or not the manager information of all the DVDs in the CD folder have been constructed, and if they have been constructed, the procedure is finished (Step D13).

According to the above-described device, when, for example, a disk number is given thereto from the external operation device 700 via a remote control device or the like, the micro-processor 207 compares the input disk number and the disk numbers for management stored in the disk manager information memory device 300, so as to judge if the same number is present in the device. Where the number is the same, the disk type and the reproduction manager information which correspond to the disk number are read, and the reproduction device is set to the mode corresponding to the type of disk. Further, the reproduction manager information is set to the corresponding reproduction system. Consequently, even if disks are exchanged, it is not necessary to read the reproduction manager information each time, but a selected disk is played immediately.

In the above-described apparatus, the disk storage device 500 is capable of holding a plurality of disks of the same type or different types. The disk manager comprising the micro-processor 207, the memory device 300 and the like, serves to store the disk storage position data, the disk type data and the control data necessary for reproducing the data of the disks in the memory unit in advance together with the management additional data (disk number or title) for each disk. Further, the searcher consisting of the micro-processor 207 and the memory device 300 compares the input additional data with the management additional data, when the additional data of a disk is input from outside, and searches for the matching additional data. Thus, the disk storage position data, the disk type data, and the control data, which are associated with the matching additional data, are read out from the memory unit of the disk manager.

The disk manager includes a variation judgment element which judges the exchange, the addition, and the subtraction of disks. When there is the exchange or addition of disks, the type data and control data of the disks at the corresponding storage positions are stored in the memory unit. Further, although not specifically shown in the figure, the disk management includes a setting unit for canceling the disk type data and control data at the storage positions from where disks are subtracted when the subtraction is carried out. The searcher serves to set a signal reproduction status of the entire apparatus by giving the disk storage position data read from the memory to the disk exchanger 600, the disk type data to the selector 203 which selects a disk data reproduction system, and the control data to the selected one of the disk data reproduction systems 205 and 206.

Further, with the above-described apparatus, where a CD is played for several minutes after one chapter of a DVD is reproduced, the reproduction of the sound is carried out smoothly after the exchange of the disk to be played, since the reproduction manager information necessary for the reproduction is read out and stored in the memory device in advance. Further, when the reproduction of the data of the DVD is continued after the CD, the time required to read the reproduction manager information from the disk can be skipped over.

As to the timing for updating the disk manager information in the memory device 300, the updating process may be started when the user inputs a command from the operation unit, or it may be automatically carried out when any of the disks in the disk storage device 500 is exchanged or subtracted, with providing particular means for detecting such a state.

Next, the format of DVD as well as the types of data present as the reproduction manager information, are described.

Figure 6:
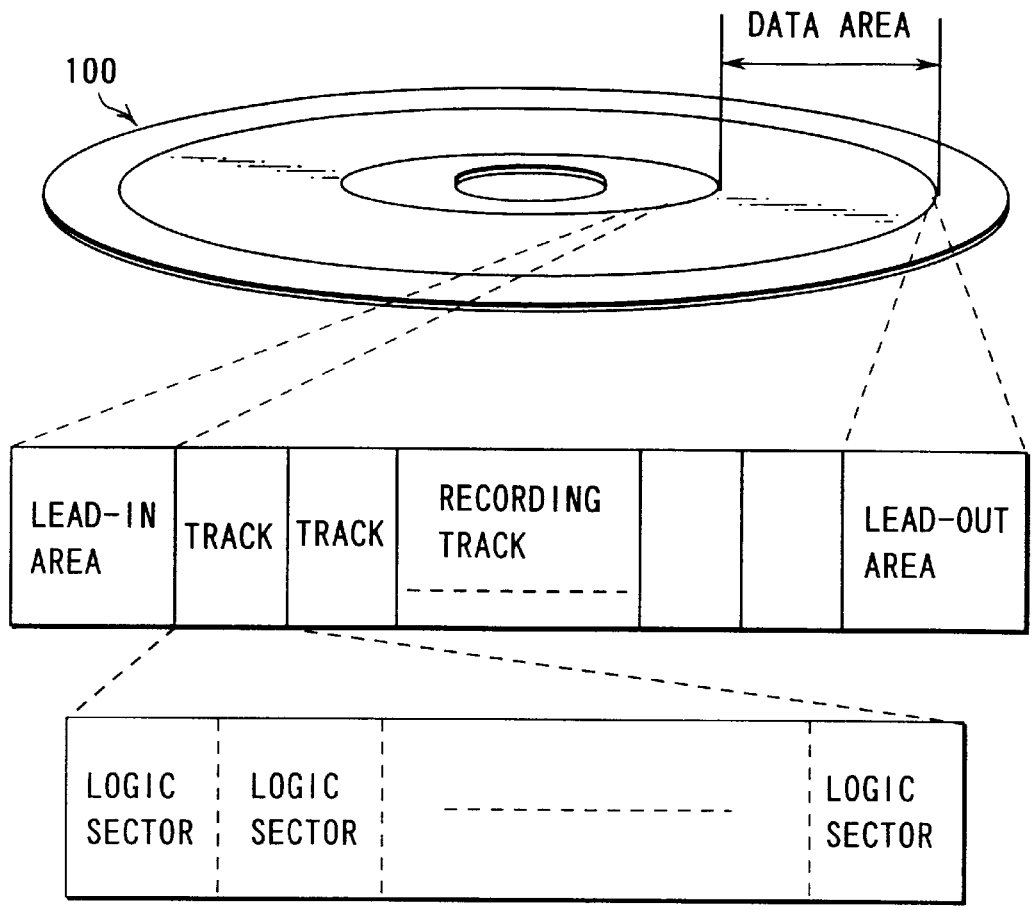
FIG. 6 is a diagram illustrating the volume space of a DVD.

FIG. 6 is a diagram schematically showing the recording data structure of a DVD 100.

The DVD 100 is a disk having a memory capacity of, for example, about 5 GByte on one surface, and made of two substrates adhered together. On the disk, there are a great number of recording tracks arranged between the lead-in area located near the inner circumference of the disk, and the lead-out area located near the outer circumference. Each of the tracks consists of a great number of logic sectors, in which various data (appropriately compressed digital data) are stored.

Figure 7:
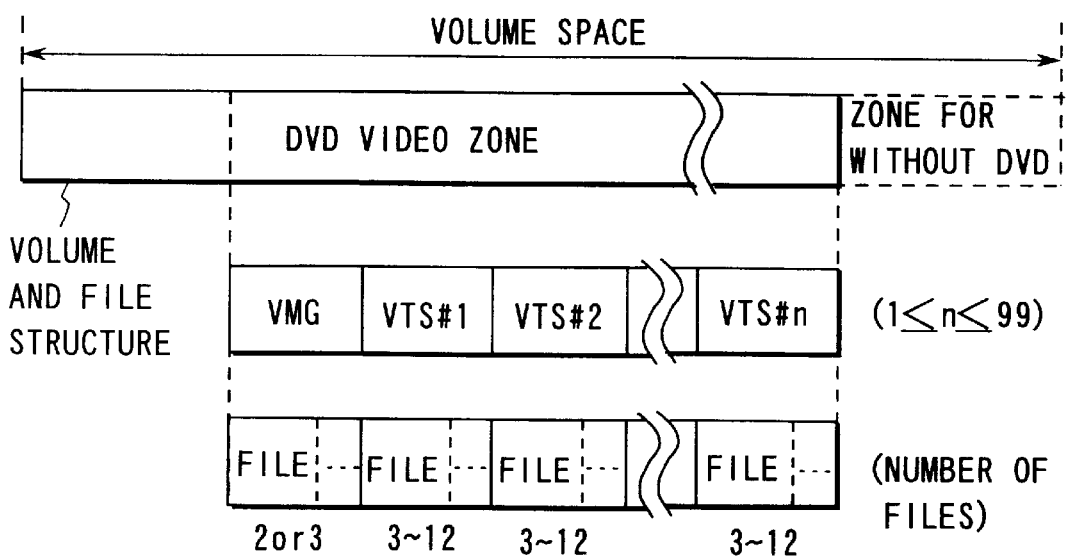
FIG. 7 is another diagram illustrating the volume space of a DVD.

FIG. 7 is a diagram showing a volume space of the DVD 100 shown in FIG. 1.

As can be seen in FIG. 7, the volume space consists of a volume and file structure zone, a DVD video zone and other zone. In the volume and file structure zone, UDF (Universal Disk Format Specification Revision 1.02) bridge structure is written, such that the data can be read by a general purpose computer. The DVD video zone has a video manager (VMG) and a video title set (VTS). The video manager (VMG) and the video title set (VTS) each consist of a plurality of files. The video manager (VMG) is data for controlling the video title set (VTS).

Figure 8:
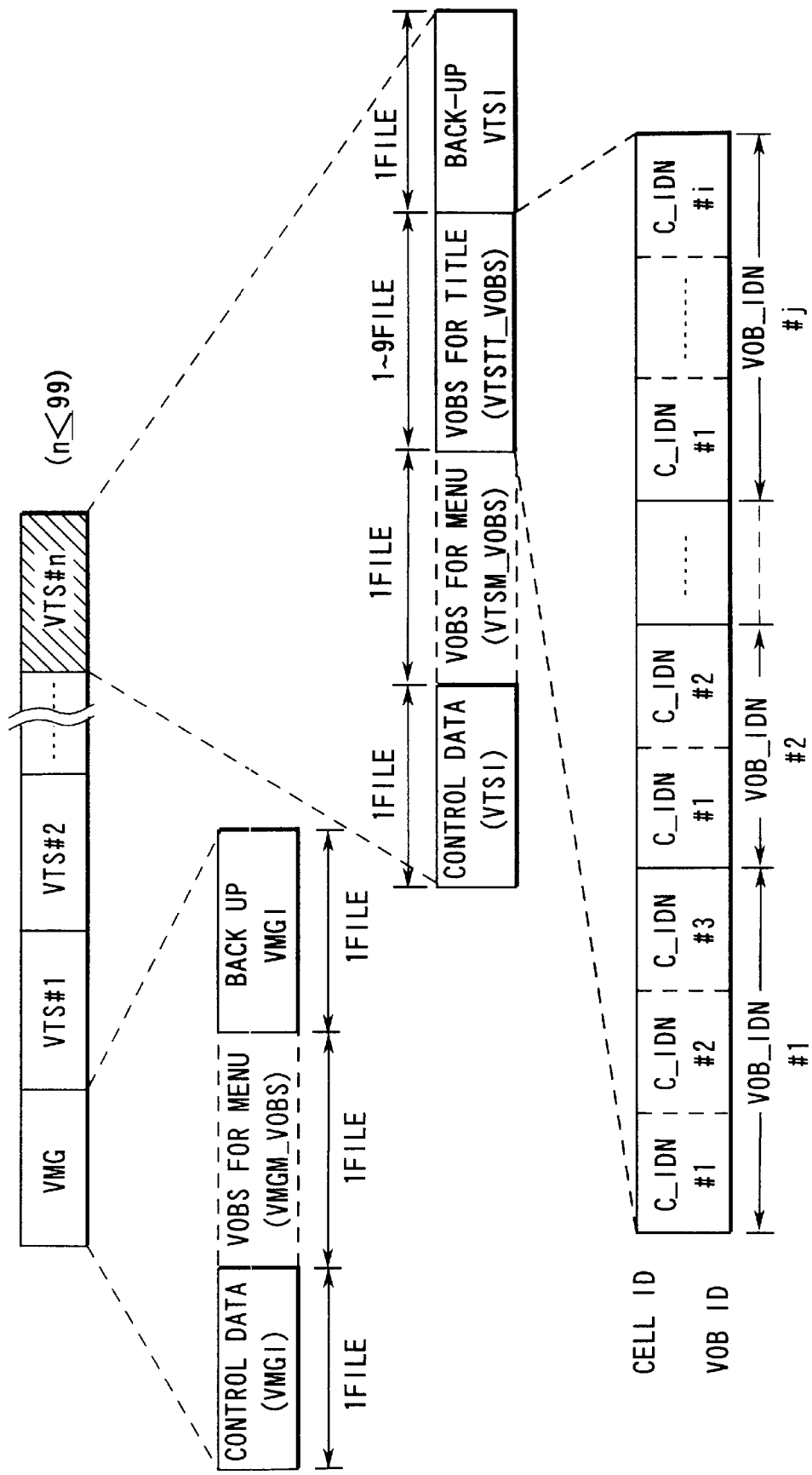
FIG. 8 is a diagram illustrating the data sequence structure of a DVD.

FIG. 8 shows the structure of each of the video manager (VMG) and the video title set (VTS) in detail.

The video manager (VMG) contains video manager information (VMGI) serving as control data, and video object set (VMGM_VOBS) serving as the data for menu display. The VGM further contains backing-up video manager information (VMGI) having the same contents as that of the above-mentioned VMGI.

The video title set (VTS) contains video title set information (VTSI) serving as control data, video object set (VSTM_VOBS) serving as the data for menu display, video object set (VTSTT_VOBS) for the title of the video title set, which is a video object set for image display. The VTS further contains backing-up video title set information (VTSI) having the same contents as that of the above-mentioned VTSI.

Further, the VTSTT_VOBS, which is the video object set for the image display, consists of a plurality of cells (Cells). Each cell (Cell) is assigned with a cell ID number.

Figure 9:
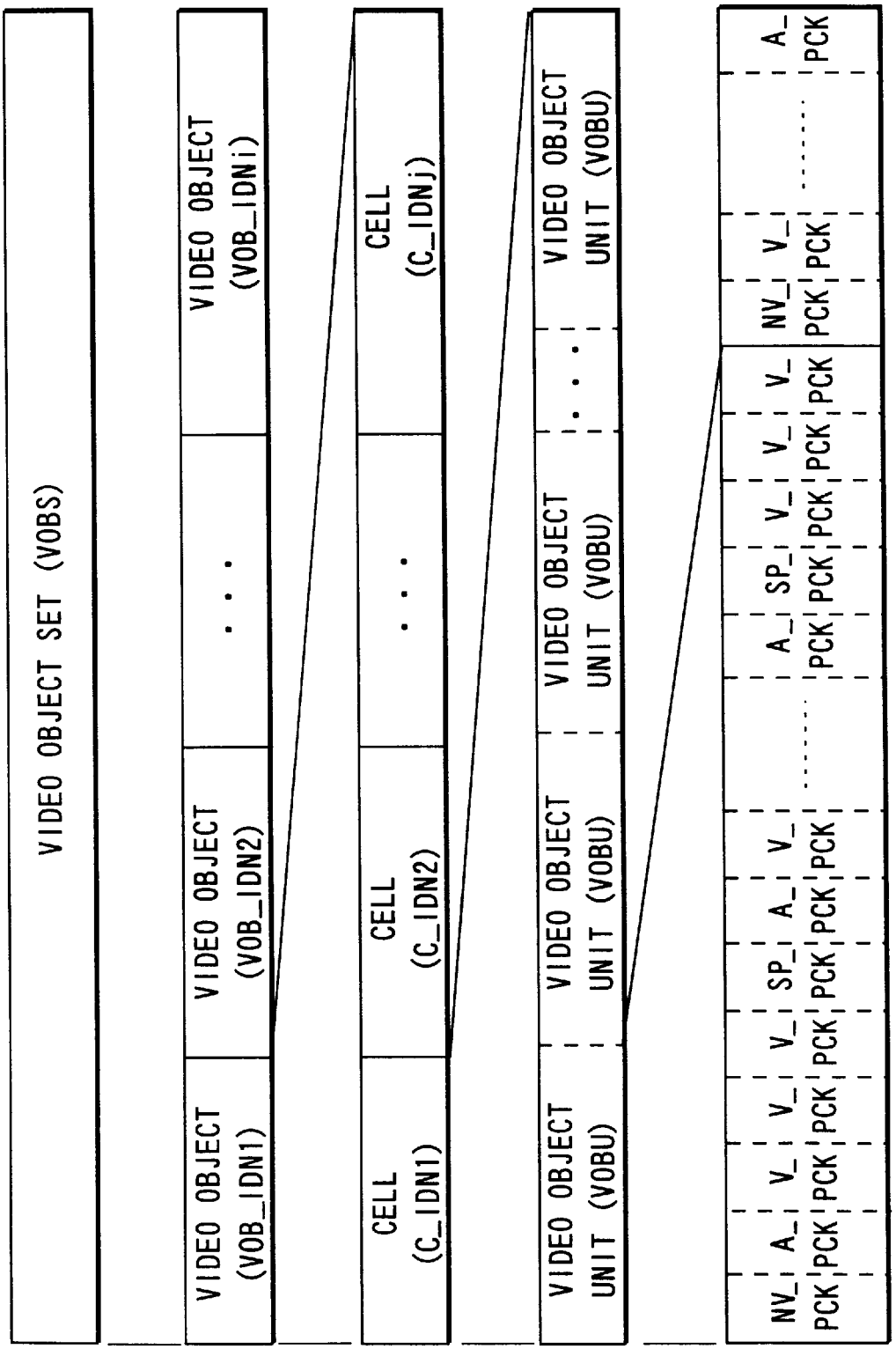
FIG. 9 is another diagram illustrating the data sequence structure of a DVD.

FIG. 9 shows, in a hierarchical structure, the correlation between the video object set (VOBS) and Cells, and the contents of a Cell. In the reproduction process of the data of DVDs, a cut of a scene (changing the scene, angle, story or the like), and a special reproduction are processed in the unit of a Cell or video object unit (VOBU) which is a lower layer of the cell.

The video object set (VOBS) consists of a plurality of video objects (VOB_IDN1 to VOB_IDNi). Each video object consists of a plurality of cells (C_IDN1 to C_IDNj). Each cell consists of a plurality of video object units (VOBU). Each video object unit consists of one navigation pack (NV_PCK), a plurality of audio pack (A_PCK), a plurality of video pack (V_PCK), a plurality of sub-picture pack (SP_PCK).

The navigation pack (NV_PCK) is mainly used as the control data for controlling the reproduction display of data in the video object unit to which the NV_PCK belongs, and the control data for carrying out the data research of the video object unit.

The video pack (V_PCK) is main image data, and compressed under the specification of MPEG or the like. The sub-picture pack (SP_PCK) is sub-image data having contents auxiliary to the main image, that is, for example, data superimposed in a movie. The audio pack (A_PCK) is voice data.

Figure 10:
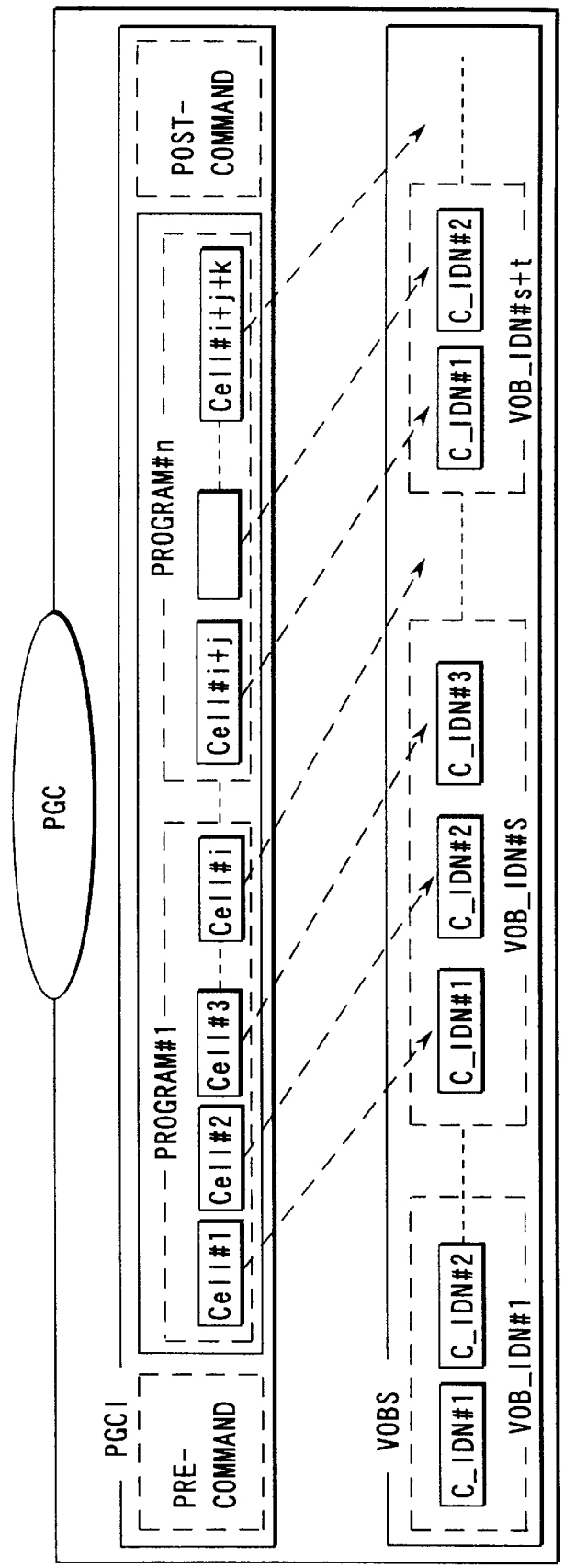
FIG. 10 is a diagram illustrating the program chain for reproducing the contents of a DVD.

FIG. 10 shows an example where the order of the reproduction of the data of the Cells is controlled by a program chain (PGC).

As to the program chain (PGC), a variety of program chains (PGC#1, PGC#2, PGC#3, . . . ) are prepared such as to be able to set the order of the reproduction of data in cells in various ways. As a particular program chain is selected, a particular order of the reproduction of the data in cells is set. The program chains are contained in the video title set data (VTSI) or video manager data (VMGI).

FIG. 10 illustrates an example where program #1 to program #n are executed by program chain information (PGCI). The program shown in this figure has the contents in which cells from those designated by (VOB_IDN#s, C_IDN #1) onwards, are designated in order.

FIG. 11 shows various types of tables in the video manager data (VMGI). The video manager data (VMGI) contains the following written tables, namely, the video manager table (VMGI_MAT), the title search pointer table (TT_SRPT), the video manager menu PGCI unit table (VMGM_PGCI_UT), the parental manager information table (PTL_MAIT), the video title set attribute data table (VTS_ATRT), the text data manager (TXTDT_MG), the video manager menu cell address table (VMGM_C_ADT), the video manager menu video object unit address map (VMGM_VOBU_ADMAP), and the like.

FIG. 12 illustrates the contents of the video manager table (VMGI_MAT).

VMG_ID is identification data indicating that it is a file of the video manager data. VMG_EA expresses the finishing address of VMG by the number of logic blocks counting from the start of the VMG. VMGI_EA expresses the finishing address of VMGI by the number of logic blocks counting from the start of the VMGI. VERN is a version number. VMG_CAT is a video manager category, contains area manager information, and expresses, as for each area, whether or not the reproduction is carried out in the area. VLMS_ID is volume set identification data, and expresses, for example, a site in the volume set, where the numerical value of volume, volume number, volume are written. VTS_Ns expresses the number of video title sets. PVR_ID is the identification data exclusive for the provider. POS_CD is a POS code. VMGI_MAT_EA is the ending address of VMGI_MAT. FP_PGCI_SA is the starting address of a first play program chain (FP_PGCI). VMGM_PVOBS_SA is the starting address of the VMGM_VOBS. TT_SRPT_SA is the starting address of a title search pointer. VMGM_PGCI_UT is the starting address of the program tune unit table of the video manager menu. PTL_MAIT_SA is the starting address of the parental manager information table. VTS_ATRT_SA is the starting address of the attribute data of the video title set. VMGM C_ADT_SA is the starting address of the video manager address table. VMGM_VOBU_ADMAP_SAGCI is the starting address of the address map of the video manager video object unit. Further, VMGM_V_ATR is the video attribute of the video manager menu. VMGM_AST_Ns is the number of audio streams of the video manager menu. VMGM_AST_ATR is the audio stream attribute of the video manager menu. VMGM_SPST_Ns is the number of sub-picture streams of the video manager menu. VMGM_SPST_ATR is the sub-picture stream attribute of the video manager menu. FP_PGCI is the first play program chain.

By knowing the above-listed contents of the video manager information management table, the starting address, attribute and the like, necessary for reading various types of data can be grasped. Consequently, the reading of data, and setting the mode of the reproduction device can be realized. When at least the starting address of the title set search pointer table is known, the title search pointer table, which will be later explained, can be read and the reproduction mode can be realized. In the video title set data (VTSI), the data necessary for reproducing the corresponding video title set is written. Such data is similar to the contents of the above-listed VMGI.

Figure 13:
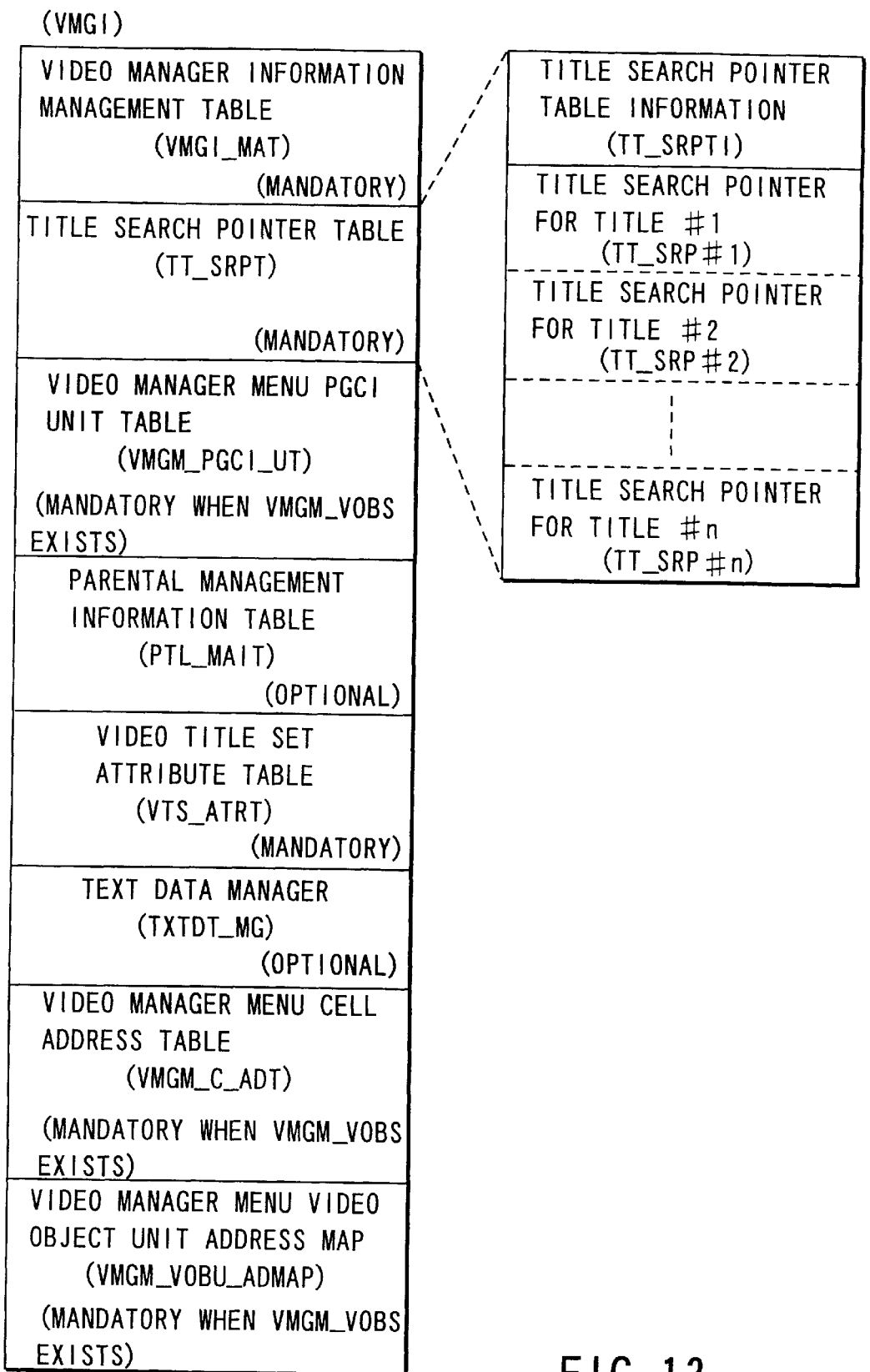
FIG. 13 is another diagram illustrating the structure of the logic format of a DVD.

FIG. 13 shows the contents of the title search pointer table (TT_SRPT) The title search pointer table (TT_SRPT ) contains the title search pointer table data and the title search pointers for all the titles.

FIG. 14 shows the contents written in the title search pointer table data, namely, the number of title search pointers, the ending address of the title search pointer table and the like.

FIG. 15 shows the contents of a title search pointer. The contents include the title playback type, which indicates which one of the single system and multiple system is prepared as the playback system. Further, the number of angles, which indicates how many images picked up from different angles are recorded in the system to be played back, is written. Furthermore, the number of title sections in the the parental identification field for title, the video title set number, and the starting address of the video title set are written.

Of the TT_SRPs listed above, when at least the title playback type and the starting address of the VTS are known, the video title can be reproduced.

As the reproduction manager information, not only the above-listed items, but also the manager information recorded on the disk may be read and stored, such that further more data can be utilized.

Figure 16:
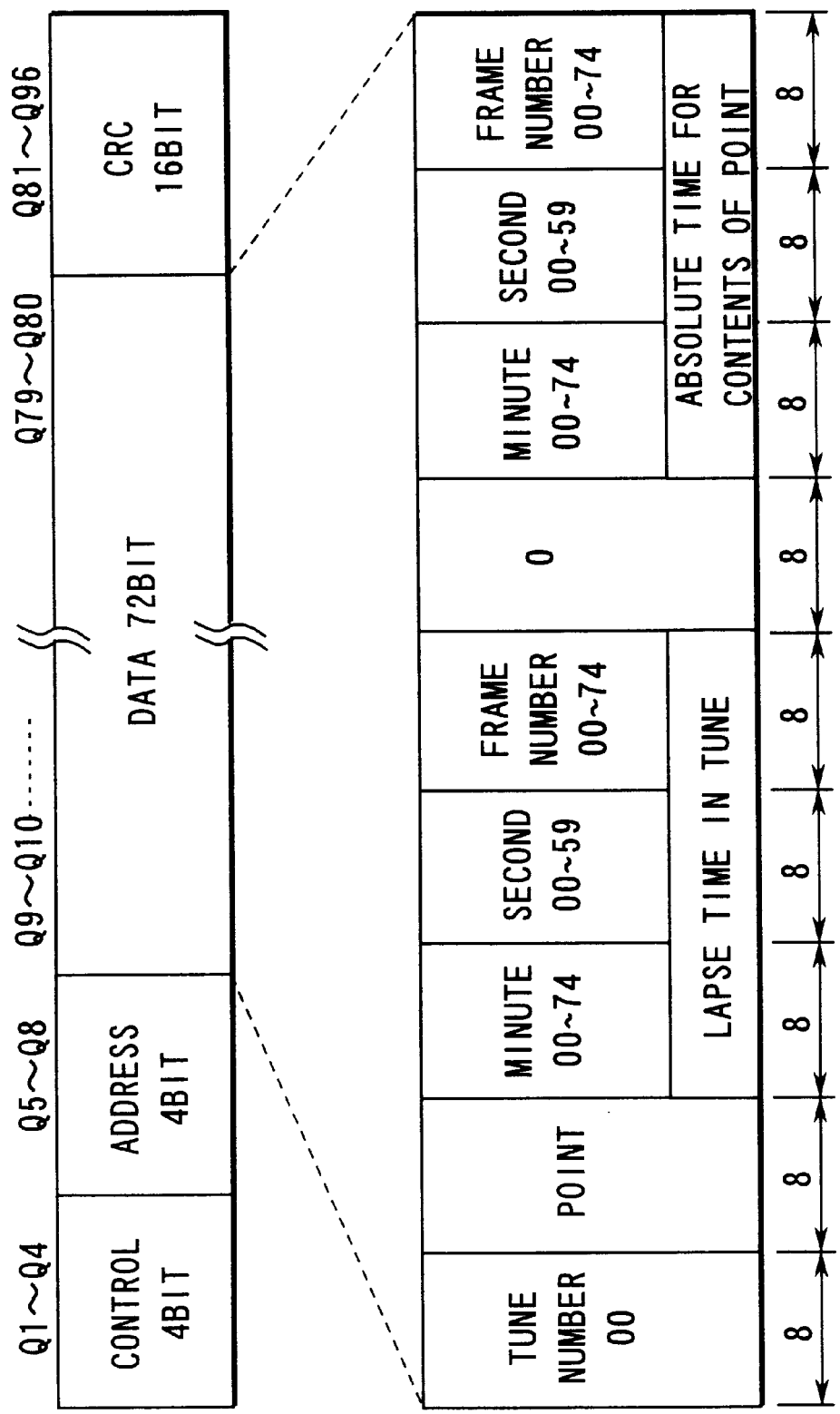
FIG. 16 is a diagram illustrating the contents of TOC of a CD.

FIG. 16 shows the contents of the TOC recorded in the inner circumferential area of a CD.

The control 4 bit is used to identify the number of audio channels, emphasis, and digital data (CD-ROM). The address 4 bit contains the maker's code. The-data 72 bit contains the tune number, the absolute time when each tune is started (POINT), the time lapse in the tune, the frame number, and the absolute time where the lead-out is started.

As described above, according to the present invention, the disk storage device capable of storing disks of a plurality of types, or a plurality of disks of the same type, is provided so as to be able to freely manage the disk stored in this device, thus making it possible to enhance the operability. In particular, the reproduction manager information necessary for reproducing the data of disks are in advance stored in the memory device. Therefore, when disks are exchanged, their data can be reproduced at high continuity.

Next, the measures to be taken for the case where external disks and internal disks are exchanged, or external disks are newly added, in the disk storage device 500 will now be described.

FIGS. 17, 18A, 18B and 18C are diagrams illustrating the basic operation of the disk storage device 500.

Figure 17:
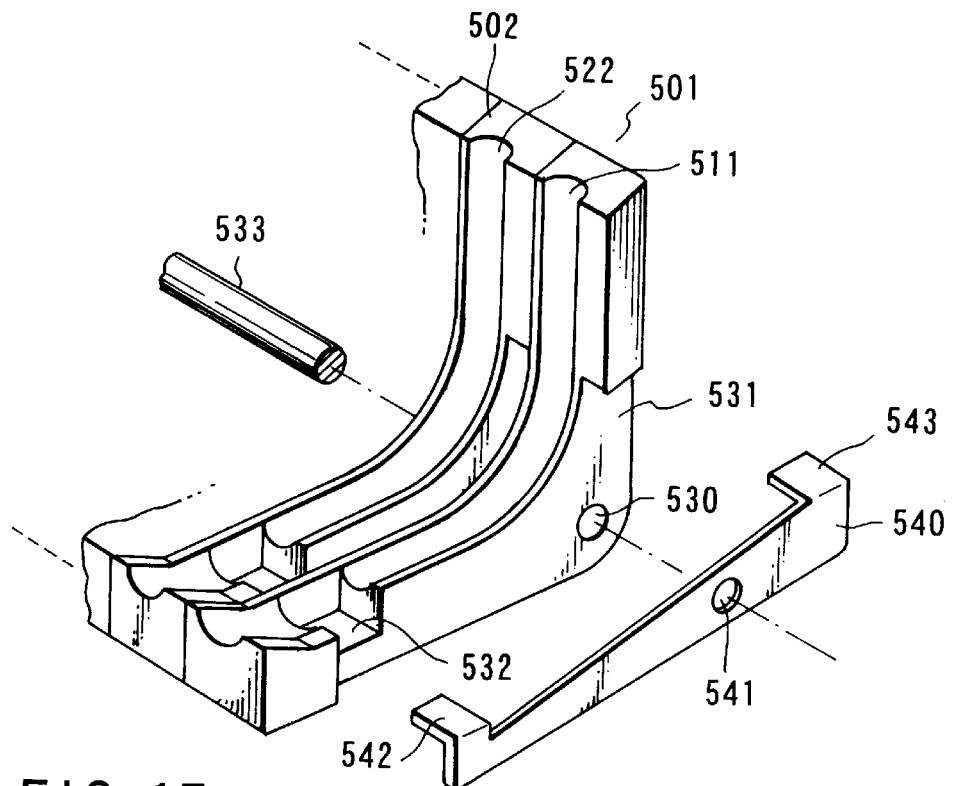
FIG. 17 is a perspective view of an example of the disk holder of the disk storage unit.

As can be seen in FIG. 17, the disk storage device 500 is made of a great number of disk holders 501, 502, . . . , having an appearance of L-letter shape, for example, when viewed from the side, which are all integrated into one unit. In this figure, two disk holders 501 and 502 are shown as typical models. In the surfaces of the inner circumferential portions of the disk holders 501, 502, . . . , grooves 511, 512, . . . , each having such a size that the edge of a disk can fit in, are made respectively. The disk holders 501 and 502 each have a hole 530 made at their bent portions (the hole of disk holder 502 is not shown in the figure), and as a shaft 533 is pierced through the holes 503, all the disk holders are integrated as one unit. In side surfaces of the disk holders 511 and 512, cut sections 531 and 532 are formed respectively, in which the handle 540 is placed in the cut sections. The handle 540 shown in this figure is a type which corresponds to the disk holder 501.

The handle 540 has a hole 541 at its middle portion, through which the shaft 533 is pierced. At both ends of the handle 540, pieces 542 and 543 are respectively formed. These pieces 542 and 543 are bent towards the thickness direction of the disk holder 501. Further, a clearance section 532 in which the piece 542 can be housed when the disk holder 501 and the handle 540 are integrated as one, is formed in the disk holder 501.

Figure 18A:
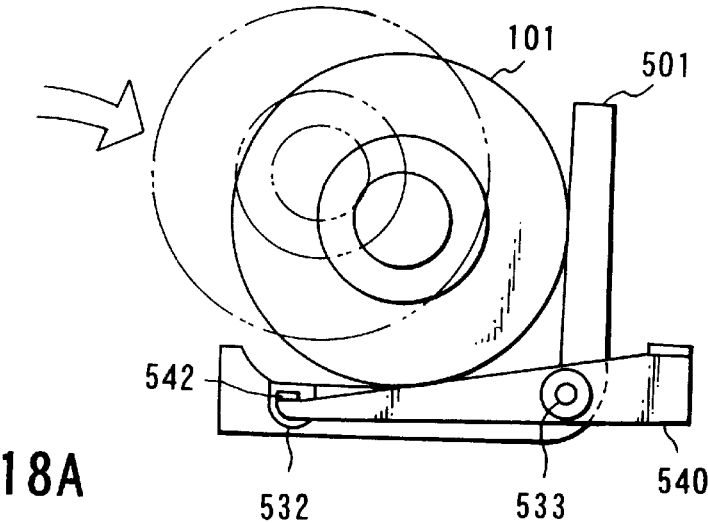
FIGS. 18A, 18B and 18C are diagrams illustrating the operation of the disk holder.

FIG. 18A shows a position of the disk holder 501 to receive a disk 101 from outside as the entire disk holders of the disk storage device 500 are rotated around the shaft 533. The handle 540 is mounted to the corresponding disk holder 501 by means of a spring (not shown) such as to elastically maintain the status shown in FIG. 18A.

Figure 18B:
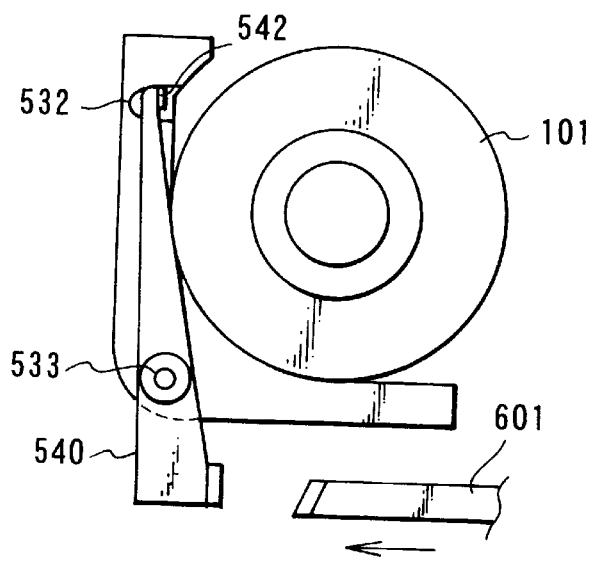
Figure 18C:
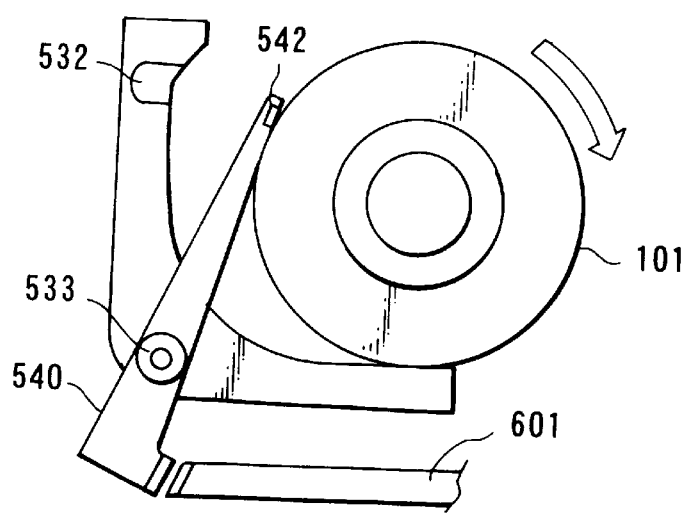

When a disk is actually played automatically after external disks are stored, all the disk holders are rotated around the shaft 533 and set in the position as shown in FIG. 18B. Supposing that the disk 101 is unloaded from the disk exchanger 600, a lever 601 corresponding to the handle 540 is extended from the disk exchanger 600. Then, as can be seen in FIG. 18C, the handle 540 is pivoted such as to push the disk 101 out by the piece 542 of the handle 540. Thus, the disk 101 is received by the disk exchanger 600 and set in the reproduction apparatus 200.

The position of the disk holder shown in FIG. 18A illustrates a state in which it is accessed from outside, whereas the position shown in FIG. 18B illustrates a state in which the disk holder is accessed internally. The position of a folder is detected by, for example, an optical switch and recognized by the micro-processor 207. Whether or not a disk is mounted on a folder is detected a contact-type switch provided on the folder itself, or the optical switch which uses a light emitting diode and a light receiving diode. Further, which ones of the disk holders hold or do not hold disks are recognized by the micro-processor.

Figure 19:
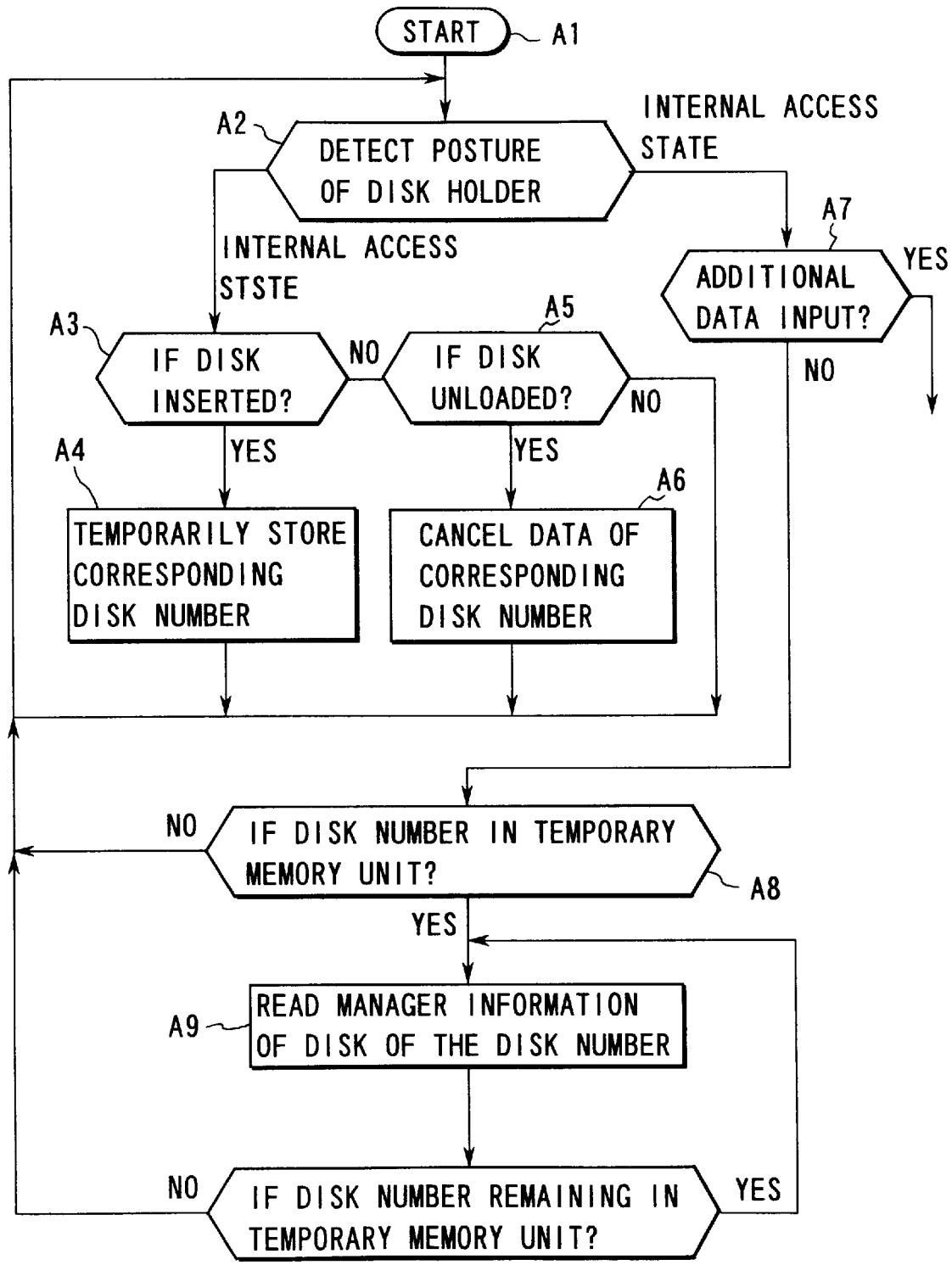
FIG. 19 is a flowchart illustrating the operation of the disk detector and the operation for reading manager information under the control of a micro-processor.

FIG. 19 shows the operation of the microprocessor 300 in the case where a disk holder of the disk storage device 500 is accessed from outside. The flowchart shown in this figure illustrates the case where a new disk is inserted from outside, and only the manager data of the new disk is read to be stored in the memory device 300.

More specifically, the positions of the disk holders 501 and 502 are detected (Steps A1 and A2). When the disk holders are in the internal access state, it is determined whether a disk has been inserted (Step A3). When it is judged that a disk has been inserted, the disk number, which indicates the holder position in which the disk has been inserted, is stored in the temporary memory unit (Step A4) since it has been determined that a new disk is inserted in the disk storage device 500. When it is judged in Step A3 that no disk has been inserted, it is further determined whether or not a disk has been withdrawn from the holders (Step A5). When it is determined that a disk has been withdrawn, the data of the corresponding disk number is canceled. That is, in the table shown in FIG. 2, the type and manager information of the corresponding disk are canceled.

In Step A2, when the position of the disk holder is of the internal access state, it is determined if additional data has been input in Step A7. In the case where additional data has been input, the corresponding disk is set in the reproduction device to execute the reproduction as described before.

Where there is not additional data input, the procedure moves on to Step A8, where it is judged if the disk number is present in the temporary memory unit. Where there is no such disk number found, the procedure returns to Step A2 since it indicates that no disk has been inserted. Where the disk number is found to be present, the manager information of the disk corresponding to the disk number is read in advance. Thus read manager information is stored in the disk manager information memory device 300 shown in FIG. 2 (Step A9). The reading process of the manager information is carried out as illustrated in FIGS. 4 and 5.

Further, it is determined if a disk number stored in the temporary memory unit is still remaining, and in the case where it is still remaining, the management data of the disk corresponding to the disk-number is read, whereas in the case where no disk number is remaining, the procedure returns to Step A2.

The above-described flowchart illustrates the case where a new disk is inserted from outside, and only the manager data of the new disk is read to be stored in the memory device 300. However, the operation is not limited to this case, but it is also possible that the manager information of all the disks stored in the disk storage device 500 are read, for example, periodically or each time a new disk is added.

Figure 20:
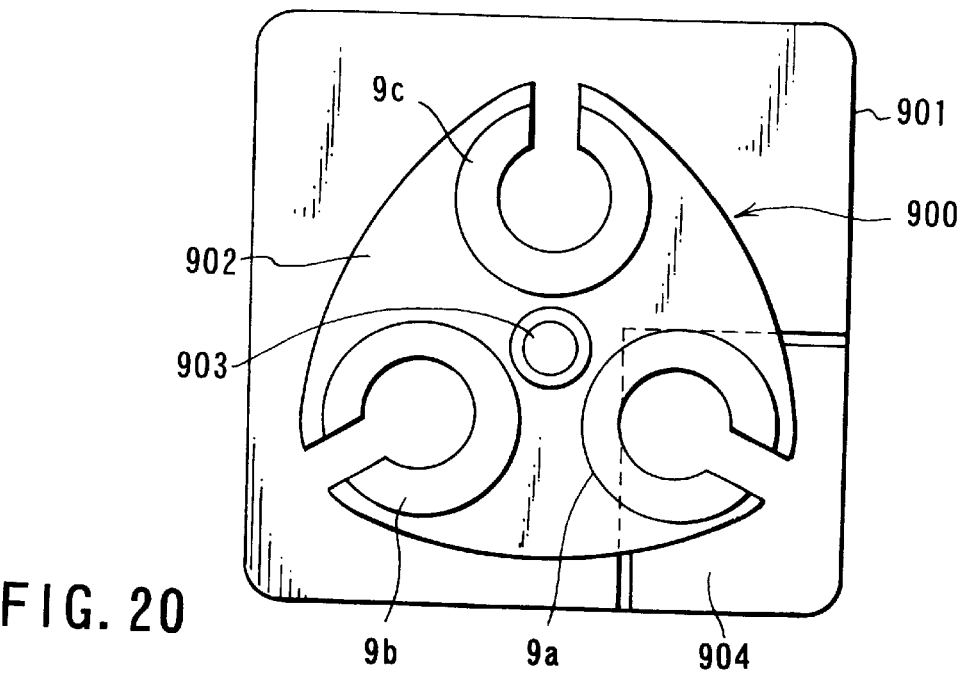
FIG. 20 is a diagram illustrating another example of the disk storage unit.

FIG. 20 shows another example of the disk storage device. This disk storage device 900 is capable of storing, for example, three disks, and also serving as a disk exchanger. The device has a base 901, to the central position of which a rotary chassis 902 driven by the motor for the disk exchange is rotatably mounted by means of a shaft 903. On a part of the base 901, a disk driving unit 904 is constructed, and a turn table and a disk motor (not shown) are mounted in this part. Disk placement units 9a, 9b and 9c, provided for the rotary chassis 902, are selectively moved to this position as they rotate. This figure shows the state in which the disk placement unit 9a is moved to the position of the disk drive unit 904.

Figure 21:
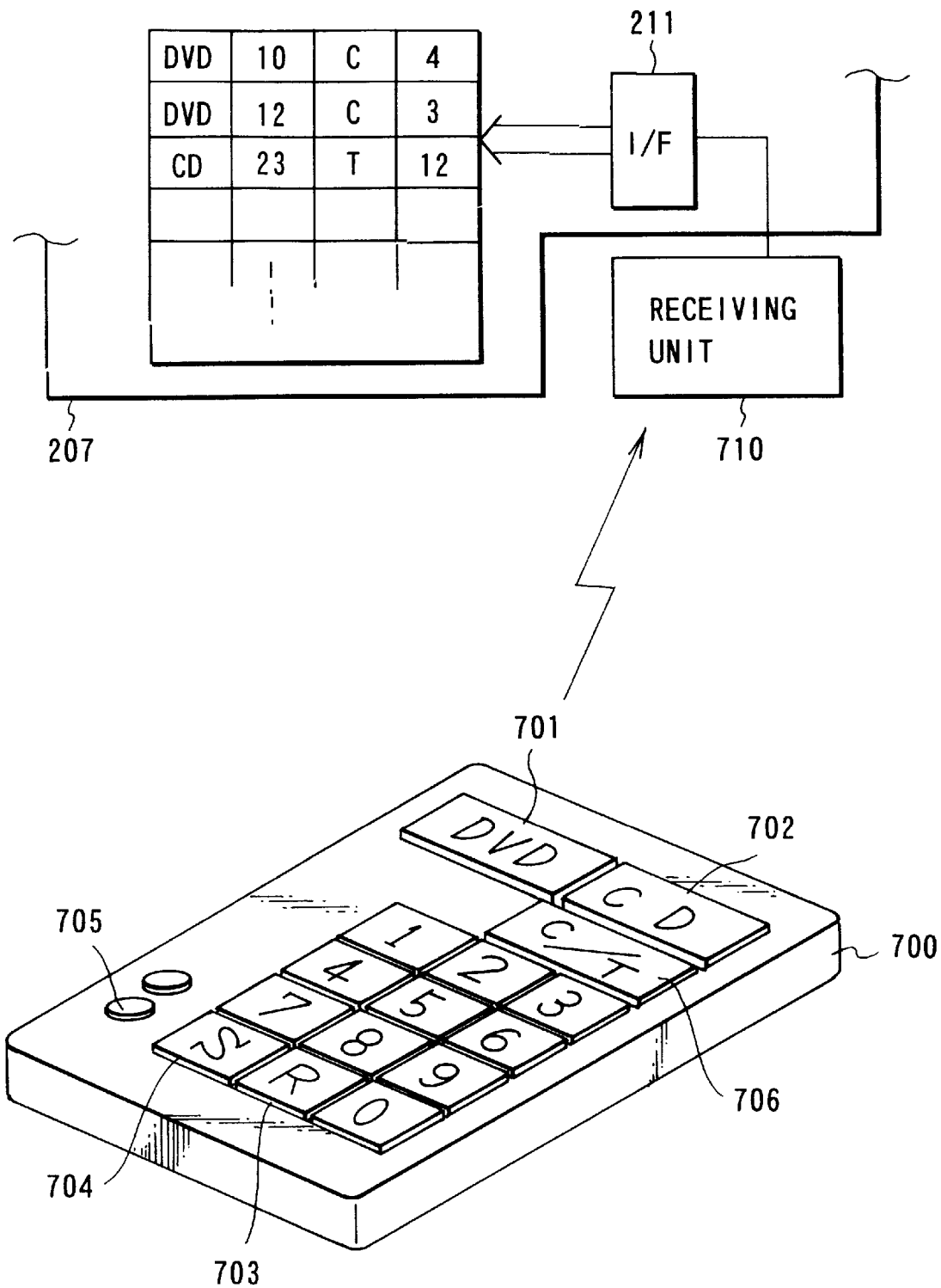
FIG. 21 is a diagram illustrating the operation of the multi-processor with regard to an external manipulation operating unit.

FIG. 21 illustrates further more details of the example of the external operation input unit 700.

The external operation input unit 700 is designed to be able to set a disk number as additional data when a disk is played. Where the reproduction is reserved, a key 703 is manipulated, and then keys 701 and 702 are manipulated to select one of DVD and CD. Subsequently, the disk number is input via numeral keys. In the case where all the disks designated are to be played from the beginning, a confirmation key 705 is manipulated. In the case where part of the designated disks is to be played, a chapter and track designation key 706 is manipulated.

After that, a chapter number or a track number is input via numeral keys. Where reserved disks are to be played one after another, a start key 704 is manipulated. Reservation data sent from the external operation input unit (remote controller) is given to the micro-processor 207 via a signal receiving unit 710. More specifically, the data received by the signal receiving unit 710 is stored in an interface memory 212 via an interface 211. In the example shown in the figure, disks are played in the order of DVD, DVD and CD. The first DVD is of a disk number 10, and the chapter 4 of the DVD is reserved to be reproduced. The next DVD is of a disk number 12, and the chapter 3 of this DVD is reserved to be reproduced. The next disk reserved to be played is CD, which is of a disk number 23, and the track (tune) number 12 is to be played.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data reproduction apparatus having an automatic disk exchanger, comprising:
   a disk storage unit which is divided into a first holder for storing disks of a first type and a second holder for storing disks of a second type;
   a disk manager which reads control data from each disk necessary for reproducing the contents of each disk and pre-stores the read control data in a memory unit, together with disk storage location data and disk type data for each respective disk;
   the disk manager further comprising:
     a holder identification unit which identifies which of the first and second holders is storing a subject disk before reading the control data of the subject disk;
     a characteristic setting unit which sets reproduction characteristics of the data reproduction apparatus according to an identification result for the holders;
     a disk identification unit which identifies a subject disk type;
     a first unit which reads reproduction control data from the disk and stores the read control data in the memory unit with the storage location data and the disk type data when the first holder is identified and the first disk type is identified;
     a second unit which considers the disk as the second type and stores the storage location data and the disk type data in the memory unit when the first holder is identified and the second disk type is identified; and
     a third unit which switches the reproduction characteristics of the data reproduction apparatus to characteristics of the second type, reads the control data of that disk, and stores the control data in the memory unit, when there is still data indicating the second type as the disk type data in the memory unit after completion of the identification of all holders in the first holder group.

2. The data reproduction apparatus of claim 1, wherein the disk manager further comprises:
   a detector which detects when an internal disk in the disk storage unit is exchanged with an external disk; and
   a control unit which rewrites the disk type data and control data corresponding to the internal disk and which stores the disk type data and control data newly read from an external disk in the memory unit.

3. The data reproduction apparatus of claim 1, wherein the disk manager further comprises:
   a detector which detects whether an external disk is added to the disk storage unit; and
   a writing element which writes the disk type data and control data of the added disk in the memory unit when the external disk is added.

4. The data reproduction apparatus of claim 1, wherein the disk manager further comprises:

a detector which detects when an internal disk is taken out of the disk storage unit; and a cancel element which cancels the disk type data and control data stored in the memory unit corresponding to the internal disk when the internal disk is removed.

5. The data reproduction apparatus of claim 1, wherein the disk manager periodically reads the disk type data and control data of all the disks stored in the disk storage device, and wherein the disk manager stores the disk type data and control data of all the disks in the memory unit.

* * * * *